(12) United States Patent
Nuti

(10) Patent No.: US 12,112,255 B1
(45) Date of Patent: *Oct. 8, 2024

(54) SYSTEM, NETWORK AND METHOD FOR SELECTIVE ACTIVATION OF A COMPUTING NETWORK

(71) Applicant: SILVRETTA RESEARCH, INC., Larchmont, NY (US)

(72) Inventor: Giuseppe G. Nuti, Larchmont, NY (US)

(73) Assignee: Silvretta Research, Inc., Larchmont, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,743

(22) Filed: Oct. 13, 2023

Related U.S. Application Data

(63) Continuation of application No. 18/198,869, filed on May 18, 2023, now Pat. No. 11,823,027.

(51) Int. Cl.
*G06N 3/047* (2023.01)

(52) U.S. Cl.
CPC .................. *G06N 3/047* (2023.01)

(58) Field of Classification Search
CPC .................................... G06N 3/047
See application file for complete search history.

(56) References Cited

U.S. PATENT DOCUMENTS

| 5,517,596 A | 5/1996 | Pechanek et al. |
| 7,904,398 B1 | 3/2011 | Repici |
| 11,386,319 B2 | 7/2022 | Le Gallo-Bourdeau et al. |
| 11,494,653 B2 | 11/2022 | Zlotin et al. |
| 2020/0019862 A1* | 1/2020 | Pescianschi .......... G06N 3/082 |
| 2020/0364545 A1 | 11/2020 | Shattil |
| 2022/0188605 A1 | 6/2022 | Laszlo et al. |
| 2023/0215498 A1 | 7/2023 | Song et al. |

OTHER PUBLICATIONS

Han et al., "Dynamic Neural Networks: A Survey", Dec. 2, 2021.

(Continued)

*Primary Examiner* — Brent Johnston Hoover
(74) *Attorney, Agent, or Firm* — Williams Mullen; Thomas F. Bergert

(57) ABSTRACT

Embodiments of the present disclosure implement a stochastic neural network (SNN) where nodes are selectively activated depending on the inputs and which can be trained on multiple objectives. A system can include one or more nodes and one or more synapses, wherein each synapse connects a respective pair of the plurality of nodes. The system can further include one or more processing elements, wherein each of the processing elements is embedded in a respective synapse, and wherein each of the processing elements is adapted to receive an input and generate an output based on the input. The system can be configured to operate such that, upon receipt of a first problem input, a first subset of the nodes in the system is selectively activated. Upon receipt of a second problem input, a second subset of the nodes is selectively activated. The second subset of nodes can be different from the first subset of nodes. In various embodiments, the first and second subsets of nodes can be selectively activated in parallel.

28 Claims, 15 Drawing Sheets

(56) References Cited

OTHER PUBLICATIONS

Talpur et al., "A comprehensive review of deep neuro-fuzzy system architectures and their optimization methods", Neural Computing and Applications, Jan. 13, 2022.
Lin et al., "A Closer Look at Branch Classifiers of Multi-exit Arcllitectures", Computer Vision and image Understanding, Jul. 13, 2022.
Wang et al.," Neural network acceleration methods via seiective activation", IET Computer Vision, Nov. 21, 2022.
Han et ai., Abstract from "Leaming to Weigllt Samples for Dynamic Early-Exiting Networks", Nov. 3, 2022.
Yu et al., "Boosted Dynamic Neural Networks", Nov. 30, 2022.

* cited by examiner

SYSTEM, NETWORK AND METHOD FOR SELECTIVE ACTIVATION OF A COMPUTING NETWORK

CROSS-REFERENCE TO RELATED APPLICATIONS

This is a continuation application of pending U.S. patent application Ser. No. 18/198,869, filed on May 18, 2023 and entitled "System, Network and Method for Selective Activation of a Computing Network".

TECHNICAL FIELD

The present disclosure relates to machine learning, and more particularly to a system, network and method for selective activation of a computing network.

BACKGROUND

Artificial neural networks (ANN) have become ubiquitous in machine learning. One of the main challenges with ANN is the need to compute the entire network for every data query and training, which renders the network unable to run multiple computations in parallel and unable to dedicate a variable amount of computational resources depending on the difficulty of the query.

Embodiments of the present disclosure implement a stochastic neural network (SNN) where nodes are selectively activated depending on the inputs and which can be trained on multiple objectives. The selective activation allows for executing queries in parallel on the same network, i.e., at the same time or substantially the same time. Advantages include the ability to construct and train large networks which only activate selectively depending on the inputs and that can run multiple parallel computations over the same network.

With stochastic neural networks, if the input is fixed, the output is likely to be different (i.e., stochastic, or random to a certain extent) for multiple evaluations. This is in contrast to deterministic neural networks, where the output over multiple evaluations is the same (deterministic) with a fixed input. For example, in a deterministic system or neural network, if an activation value for a node exceeds a threshold, the node fires. On the other hand, in a stochastic system or neural network, if the activation value exceeds a threshold, there is a probability associated with firing of the node. In other words, there is a probability of the node not firing or being activated even if the activation value exceeds the threshold.

A system according to embodiments of the present disclosure can include one or more nodes and one or more synapses, wherein each synapse connects a respective pair of the plurality of nodes. The system can further include one or more processing elements, wherein each of the processing elements is embedded in a respective synapse, and wherein each of the processing elements is adapted to receive an input and generate an output based on the input. The system can be configured to operate such that, upon receipt of a first problem input, a first subset of the nodes in the system is selectively activated. In various embodiments, once a synapse is computed, the sampling of the synapse determines whether the next node will be activated. In order to leverage both the stochastic nature of synaptic/neuron activation and the precision required to effectively train ANNs, inputs to the subsequent nodes will be the exact values of the incoming synapse as opposed to repetitive sampling. The computed value of a synapse may be used by a subsequent node/synapse even when the synapse is not activated. In other words, whilst the activation of a synapse/node is stochastic (and binary), once activated, embodiments of the present disclosure can choose to use the computed activation probability value instead of approximating it via repeated binary samples, significantly speeding up computation of subsequent synapses/nodes and finally the output values (i.e., the probability of activating one for the possibly multiple output nodes). According to embodiments, one or more of the synapses can feed into a node and activation of the node is dependent upon one or more activation weights of each of the synapses. Further, embodiments of the system and method of the present disclosure operate such that, upon receipt of a second problem input, a second subset of the nodes is selectively activated. The second subset of nodes can be different from the first subset of nodes. In various embodiments, the second subset of nodes can be selectively activated in parallel with the selective activation of the first subset of nodes.

Embodiments of the present disclosure also provide a method for partially or selectively activating a computing network, where the network includes multiple nodes and multiple synapses, where each of the synapses connects a respective pair of nodes. Each synapse has one or more respective activation weights, and a first subset of the nodes is selectively activated based on a first problem input. Each node is not necessarily activated for each problem input. A second subset of the nodes can be selectively activated based on a second problem input, where the second subset of nodes can be different from the first subset of nodes and can be selectively activated in parallel with the selective activation of the first subset of nodes.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a node may encompass one or more nodes, reference to a synapse may encompass one or more synapses and so forth.

Figure 1:
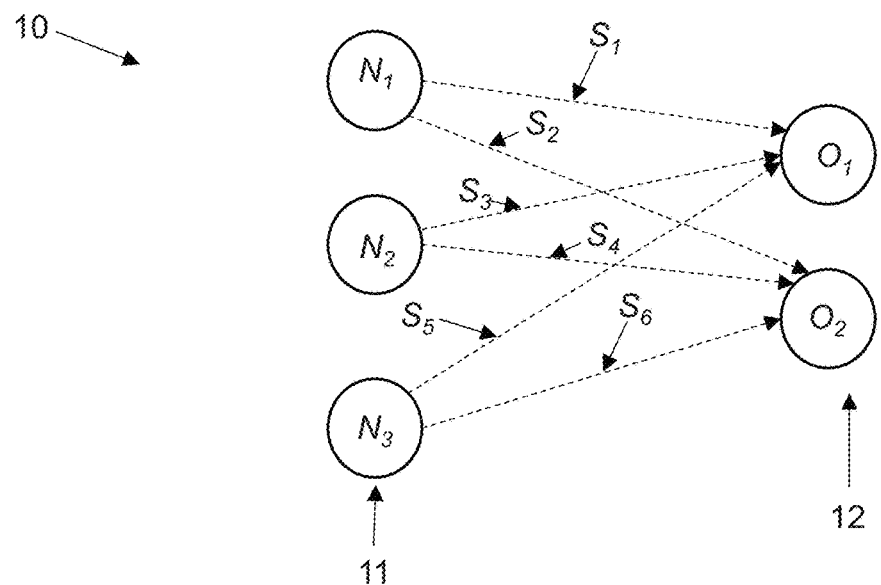
FIGS. 1 and 2 are diagrams of stochastic neural networks in accordance with embodiments of the present disclosure.

As shown in the network 10 of FIG. 1, input nodes $N_1$, $N_2$ and $N_3$ are indicated generally at 11 and output nodes $O_1$ and $O_2$ are indicated generally at 12. Each of the input nodes $N_1$, $N_2$ and $N_3$ has a respective synapse extending to a respective output node $O_1$ and $O_2$. For example, synapse $S_1$ extends from input node $N_1$ to output node $O_1$, synapse $S_2$ extends from input node $N_1$ to output node $O_2$, synapse $S_3$ extends from input node $N_2$ to output node $O_1$, synapse $S_4$ extends from input node $N_2$ to output node $O_2$, synapse $S_5$ extends from input node $N_3$ to output node $O_1$, and synapse $S_6$ extends from input node $N_3$ to output node $O_2$.

Each of the synapses $S_1$-$S_6$ has a respective processing element embedded therein, wherein each of the processing elements is adapted to receive an input and generate an output based on the input. Each of the synapses further has one or more respective activation weights associated therewith. Thus, synapse $S_1$ has at least an activation weight $w_1$ associated with it, synapse $S_2$ has at least an activation weight $w_2$ associated with it, synapse $S_3$ has at least an activation weight $w_3$ associated with it, synapse $S_4$ has at least an activation weight $w_4$ associated with it, synapse $S_5$ has at least an activation weight $w_5$ associated with it, and synapse $S_6$ has at least an activation weight $w_6$ associated with it.

Figure 2:
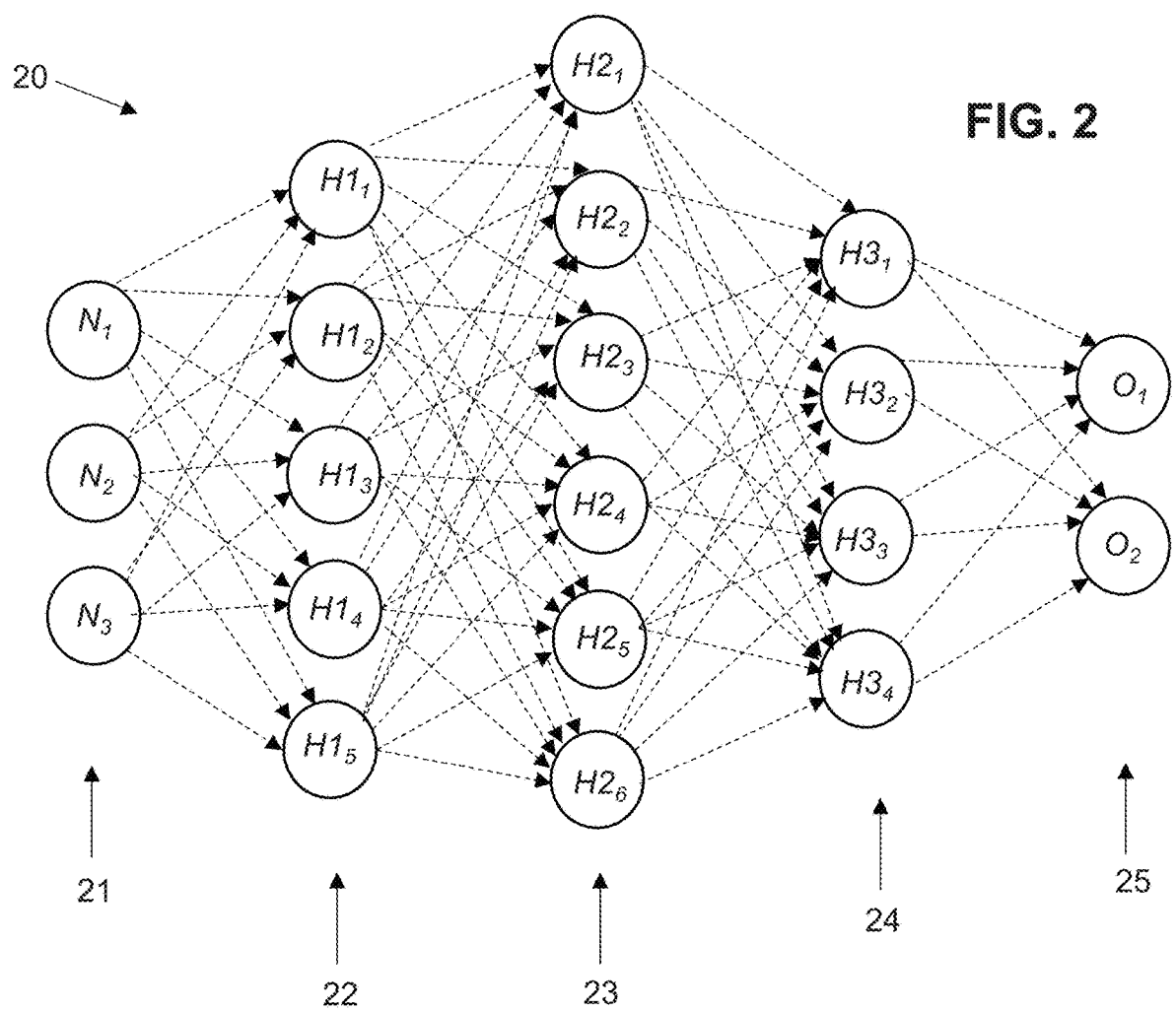

FIG. 2 shows a larger network 20 than network 10, with input nodes illustrated generally at 21, a first set of hidden layer nodes indicated generally at 22, a second set of hidden layer nodes indicated generally at 23, a third set of hidden layer nodes indicated generally at 24 and output nodes indicated generally at 25. The input nodes $N_1$, $N_2$ and $N_3$ have respective synapses extending from the input nodes $N_1$, $N_2$ and $N_3$ to each of the hidden layer nodes $H1_1$, $H1_2$, $H1_3$, $H1_4$, $H1_5$ and $H1_6$ in the first hidden layer 22. The nodes $H1_1$, $H1_2$, $H1_3$, $H1_4$, and $H1_5$ in the first hidden layer 22 have respective synapses extending to each of the hidden layer nodes $H2_1$, $H2_2$, $H2_3$, $H2_4$, $H2_5$ and $H2_6$ in the second hidden layer 23. The nodes $H2_1$, $H2_2$, $H2_3$, $H2_4$, $H2_5$ and $H2_6$ in the second hidden layer 23 have respective synapses extending to each of the hidden layer nodes $H3_1$, $H3_2$, $H3_3$, and $H3_4$ in the third hidden layer 24. The nodes $H3_1$, $H3_2$, $H3_3$, and $H3_4$ in the third hidden layer 24 have respective synapses extending to each of the output nodes $O_1$ and $O_2$. It will be appreciated that embodiments of the present disclosure can operate in networks that are not fully connected, as well as networks where nodes may skip one or more layers. Nodes may be connected to neighboring nodes both within the same layer and/or in subsequent layers.

Thus, as shown in FIGS. 1 and 2, each of the preceding synapses can feed into a node. Further, activation of each node is dependent upon the activation status of each of the synapses that feed into it. As examples of embodiments of this invention, a node can stochastically activate in a variety of situations, such as: (i) if any of the incoming synapses are activated, (ii) if all of the synapses are activated, (iii) if a transform of the incoming synapses is activated and/or (iv) if a minimum total activation status is achieved from the incoming synapses. It will be appreciated that the one or more activation weights associated with one synapse can be different from the one or more activation weights associated with a different synapse. As further shown in FIGS. 1 and 2, each node feeds into each of the subsequent synapses.

According to the present disclosure, the activation weights (and optional non-linear activation functions) are at the synapse level instead of at the node level. This is required in order to allow for distinct activation routes for different calculations throughout the network. In other words, the gating is embedded in the synapse. Further, the presently disclosed system, network and method employ stochastically activated nodes for which the computation is driven by a stochastic function of the activation value. As described elsewhere herein, the present system, network and method provide synaptic stochastic activation where the parameters of the network that control the activation and the output transform are embedded in the synapses between nodes instead of in the nodes. This ensures that calculations are selectively propagated throughout the network, as opposed to past neural networks having the computation unit in the node which is then broadcast to all the subsequent nodes.

As an example, the synaptic-specific value can be represented by the activation of any one incoming synapse into the predecessor node:

$$g(p(n_1, \ldots, n_i)) = 1 - \prod_{}^{j=1,\ldots m}\left(1 - \left(\sigma\left(w_0 + \sum^{j=1,\ldots,i} \cdot w_j p(n_j)\right)\right)_m\right)$$

where n represents node, p represents probability, w represents activation weight and the subscript m indicates the $m^{th}$ incoming synapse into a node. The above, in essence, represents the probability that any of the incoming synapses into a node is activated.

As an alternative formulation, the synaptic-specific activation for the subsequent node can be expressed as a function of a common node value, e.g.:

$$g(p(n_1, \ldots, n_i)) = \left(\sigma\left(w_0 + \sum^{j=1,\ldots,i} \cdot w_j p(n_j)\right)\right)^\gamma$$

where, in this case the m subscript is dropped as there is a common value computed at the node level which is then modulated by each synapse with a distinct activation level, namely Y. The above node activation function, $g(\cdot)$, can then be joined with the node or synaptic commuted values (for example, by multiplying the synaptic/node signal value with the node activation value). The combination of signal and activation probability (of the synapse computing the signal) allows the network to send both the signal and its activation probability, thus enabling the training to simultaneously occur both on the signal and the activation probability.

The value of the synaptic output can be either the stochastic value or the computable value given currently activated input synapses. In other words, the present disclosure can provide a fully stochastic network or, more efficiently, a fire-and-compute approach where, once a synapse is positively activated, the output value is computed with full precision taking input from all of the activated synapses during this path or any previous path computed on this input vector. The computation of the network can be done via multiple paths that can be fired simultaneously, whereby any path activating an output node further increases the precision of the output value until sufficient precision is obtained or a maximum number of paths have been fired. Specifically, a path runs through the network activating nodes stochastically based on the activation probability defined above. In its simplest form, the terminal value can be estimated at one of the possible multiple output nodes by accumulating the number of activated nodes. To speed up calculation, the network can run in hybrid mode where a computed (yet not necessarily activated) synapse is then used as a full-precision numerical value instead of an active/inactive binary value. This provides the technical advantage of automatically computing what the approximate estimation of firing multiple paths would yield. Training of the stochastic network can occur over all computed synapses or only the activated synapses. In other words, once a synapse and/or node is activated, using the probability of activation will compute the outcome probabilities without having to fire multiple paths to estimate such probabilities, yet the firing of a neuron and/or synapse is done stochastically to determine if subsequent nodes need to be sampled. Furthermore, using the hybrid fire-and-compute approach provides embodiments of the present disclosure with the ability for a synapse/node to use previously computed values unless a new input to such synapse/node has stochastically been activated and computed, thus providing the technical advantage of saving significant computational resources.

In various embodiments, an output node can be constructed with a soft max connecting all mutually exclusive values (including true/false only) to ensure that training is unbiased with respect to activation proportions of output values. In other words, an output node activating only when its value is true may provide a biased training to the network parameters. The network can be further segregated between positive activation inner layers and negative activation inner layers that can be fully separated or only partially separated, and which eventually connect to the respective true or false inputs of an output neuron, or, more generally, one of the categorical values of an output neuron.

Training optimizes the output value and probability of activation, ensuring that the network is trained to output values that minimize the error with respect to the desired output and the activation. The objective function and the transformations from input into any of the output nodes includes both the transformed output and the likelihood of the output node being activated (or a derived value, i.e., functional transformation, thereof). As described herein, multiple output nodes can be part of the same network (not necessarily mutually exclusive), selectively employing network resources based on the inputs.

Regularization can be applied as per approaches understood in the art (e.g., lasso or L1 regularization and/or ridge or L2 regularization) or by evaluating the co-activation of input synapses: the more correlated the activation is, the less useful it will likely be. The ability to assess co-activation as a proxy for the usefulness of an incoming synapse provides forms a natural regularization method based on the uniqueness of activations where two inputs that are highly correlated can be merged into one while recycling the unused synapse by drawing new random weights with a de minimis new input weight. Among other things, this promotes efficient utilization of network resources.

It will be appreciated that nodes need not connect only to the next layer but can connect with layers further out, which can improve performance in that the connection layer can be chosen from a uniform distribution of layers available before the output node, or using other methods, such as a geometric distribution, for example. Furthermore, nodes need not be fully connected to the next layer.

Figure 3:
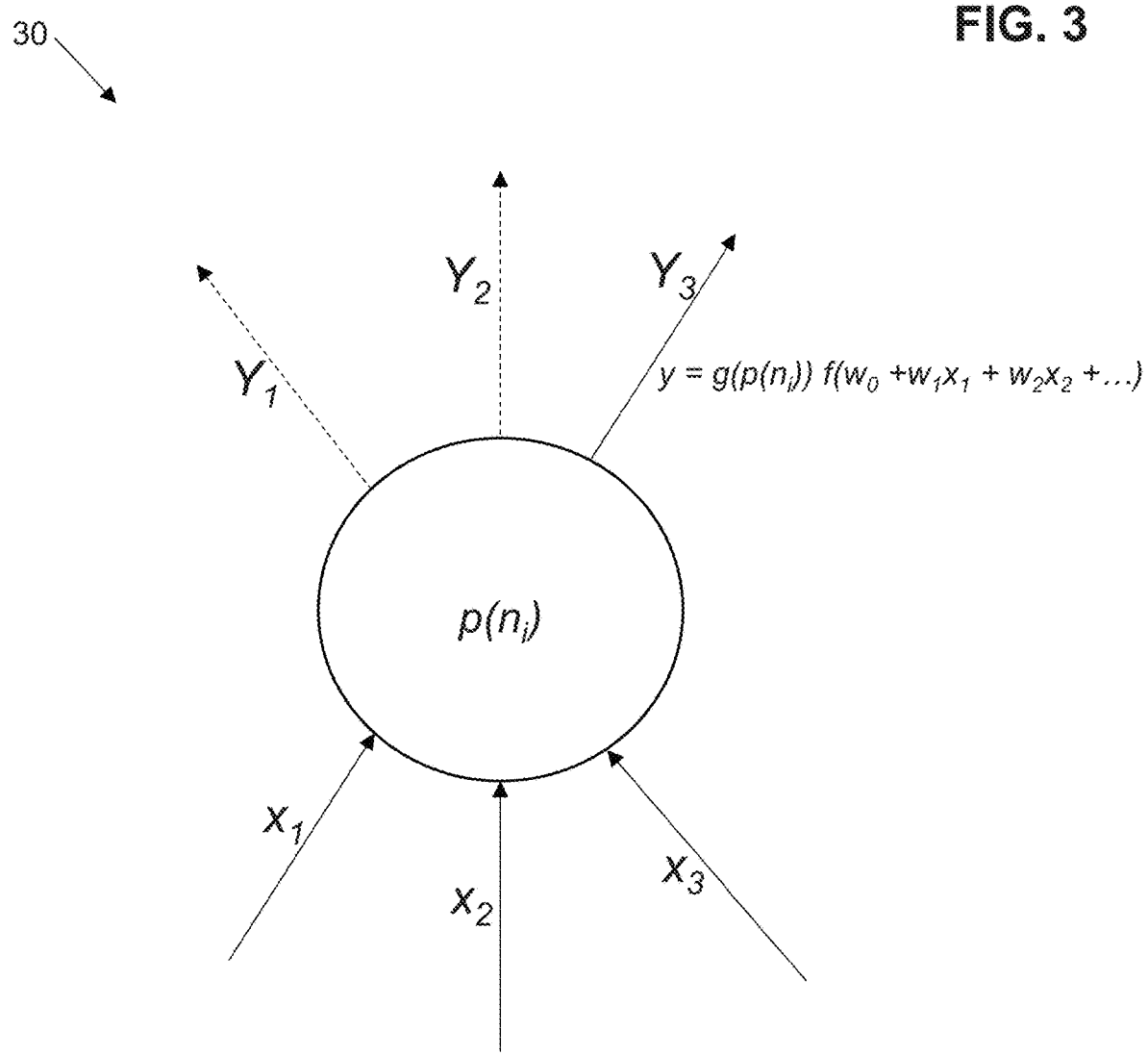
FIG. 3 is a diagram of a node with incoming and outgoing synapses in accordance with embodiments of the present disclosure, illustrating node activation.

As shown in diagram 30 of FIG. 3, the probability of node i being fired is represented as $p(n_i)$. In various embodiments, node activation depends on each incoming synapse's value as described elsewhere herein. In FIG. 3, incoming synapses are shown at $X_1$, $X_2$ and $X_3$. Each synapse $X_1$, $X_2$ and $X_3$ has its own unique set of weights, which are and/or can be distinct from the weights of other synapses extending from a given node and includes a function of the node activation $g(\cdot)$. In FIG. 3, the outgoing synapses are shown at $Y_1$, $Y_2$ and $Y_3$. Once a node is activated, all synapses originating from it are sampled, though not necessarily activated as described elsewhere herein.

According to various embodiments, the value that modulates the activation function (namely $g(\cdot)$ in FIG. 3) can be the probability of activation of the node (e.g., the probability of at least one incoming synapse being activated, noting that continuous network input values may be always activated and logical input values can be either always activated or activated only if belonging to a specific class), the probability of all synapses activating, or any function that defines the desired activation link between the output node and the input nodes.

It will be appreciated that embodiments of the approach as described herein permit multiple paths to be run in parallel through the graph. Since nodes are selectively activated, the computational lock over a node/synapse is selectively applied, allowing for multiple paths to compute in parallel, for example, at or substantially at the same time. Each path can activate one or more output nodes, thus providing the ability to train a multi-objective network (i.e., a network with multiple output nodes that are not necessarily mutually exclusive). The signature of a path, saved at synaptic activation level, allows for efficient training of the network over multiple objectives as described herein.

In various embodiments, the probability of activation can be modulated directly by adding a penalty for the probability of neural activation. This will reduce the number of nodes fired, which will depend on the difficulty of the specific input sample/query once the network is trained. This form of activation regularization can be constant across the network or depend on the state of the network, the phase of training (e.g., initial versus late-stage fine-tuning), etc.

It will be appreciated that embodiments of the present disclosure allow for different types of synapses and/or nodes with different activation functions to co-exist depending on the problem (e.g., a binary input to solve SAT-3 style problems or a continuous input to solve a visual recognition task). It will further be appreciated that the neural network construct according to the present disclosure is applicable to a wide variety of problems, in the domain of supervised and unsupervised learning, such as vision and speech recognition, etc. The presently disclosed system, method and network thus facilitate construction of larger networks where the network need not be computed in its entirety every time, along with the construction of more technically efficient networks, both computationally and in terms of energy consumption, which is well suited for mobile devices where energy consumption is naturally constrained, for example.

According to various embodiments of the present disclosure, a system can include one or more nodes and one or more synapses, wherein each synapse of the plurality of synapses connects a respective pair of the plurality of nodes. The system can further include one or more processing elements, wherein each of the processing elements is embedded in a respective synapse, and wherein each of the processing elements is adapted to receive an input and generate an output based on the input. The system can be configured to operate such that, upon receipt of a first problem input, a first subset of the nodes is selectively activated. In various embodiments, upon receipt of a second problem input, a second subset of the nodes is selectively activated. The second subset of nodes is different from the first subset of nodes. In various embodiments, the second subset of nodes is selectively activated at substantially the same time as the first subset of nodes.

Figure 4:
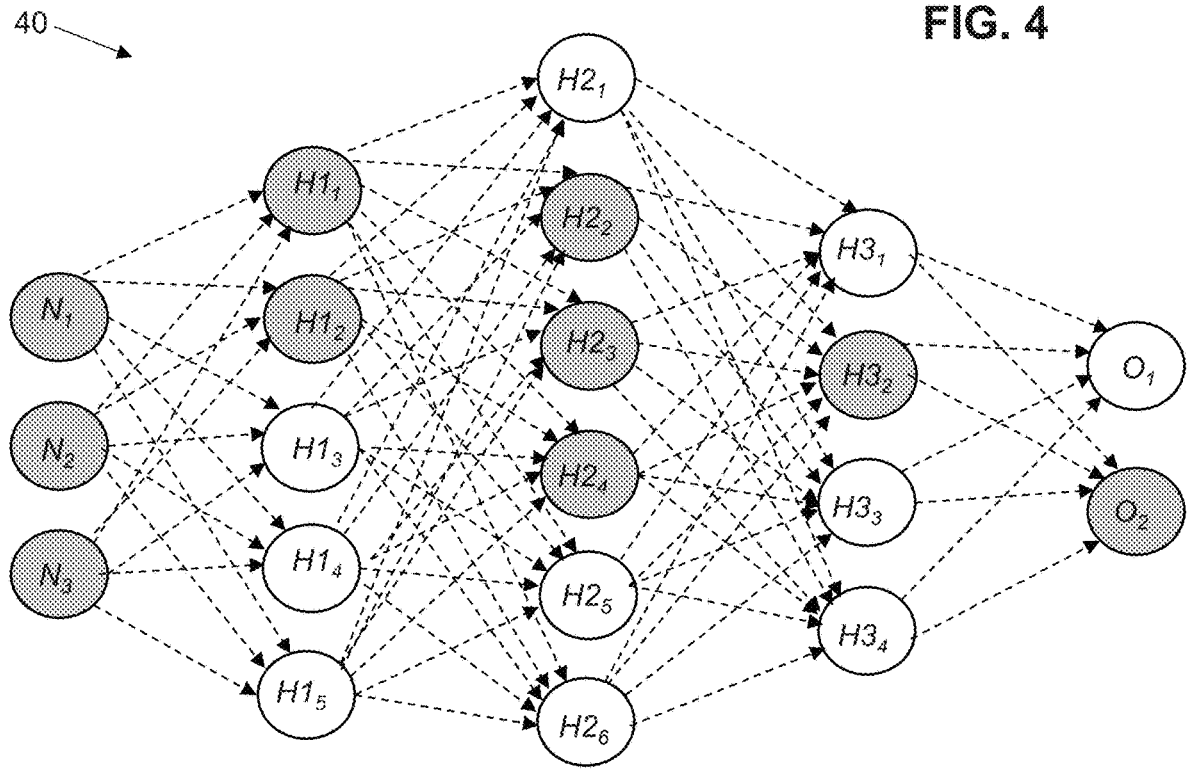
FIGS. 4 and 5 are diagrams of a stochastic neural network showing selective activation in accordance with embodiments of the present disclosure.
Figure 5:
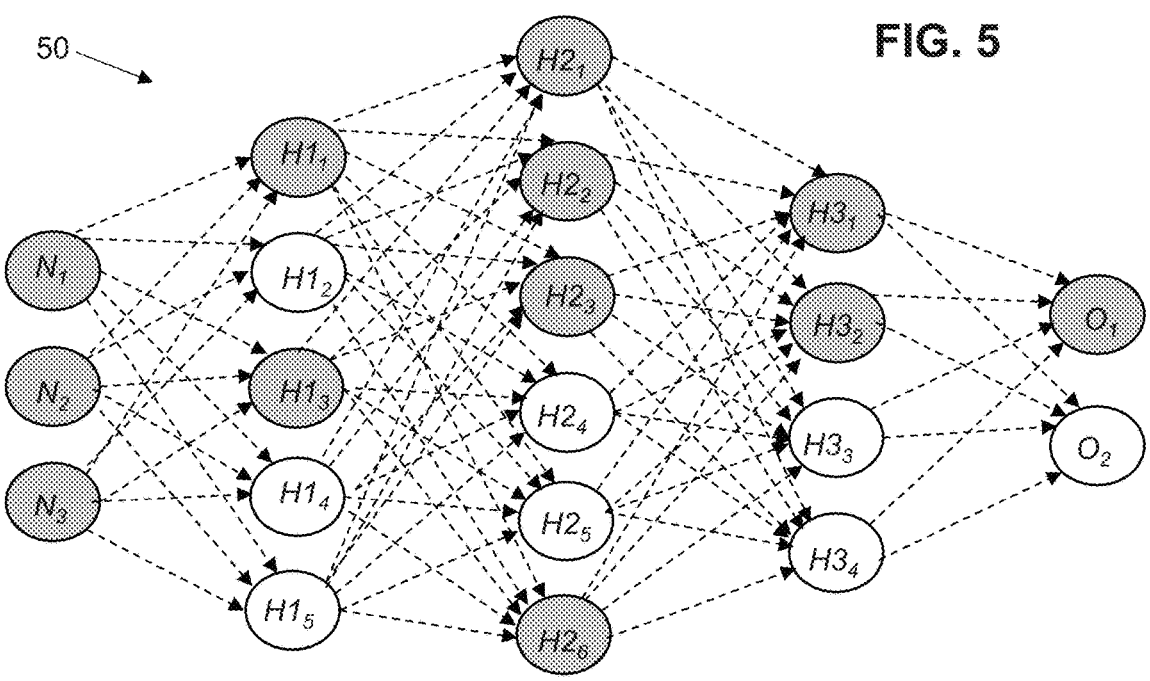

FIGS. 4 and 5 are diagrams of a stochastic neural network showing selective activation in accordance with embodiments of the present disclosure. As shown in FIG. 4, a first problem input is received which activates a specific set of nodes N1, N2, N3, $H1_1$, $H1_2$, $H2_2$, $H2_3$, $H2_4$, $H3_2$ and $O_2$, which are shaded in gray.

As shown in FIG. 5, a second problem input is received, which activates a different set of nodes N1, N2, N3, $H1_1$, $H1_3$, $H2_1$, $H2_2$, $H2_3$, $H2_6$, $H3_1$, $H3_2$ and $O_1$, shown with gray shading. As the node activation depends on the specific problem input, multiple inputs can be run over the network in parallel, i.e., at the same time or essentially the same time, augmenting node activation including the output node with details of the problem input that caused the activation. It will be appreciated that the node and/or synaptic computation is specific for each problem input being run concurrently over the network. Of note, the concurrent computation across the network can be performed over distinct problem inputs and/or over multiple stochastic samples for the same problem input (the latter no longer needing indexing activation by problem input). In various embodiments, the concurrent computation can be coded as paths that traverse the network, selectively activating one or more output nodes (or none). Each path is run independently, with the fire-and-compute approach seamlessly utilizing the latest available computed synaptic value associated with the path's problem input, regardless of the path that has activated it. This approach allows concurrent computations to run across the network, both across problem inputs and samples: the larger the network, the less likely are two paths to activate the same node at the same time, which reduces the potential for a computational lock. Further, two different problem inputs are unlikely to activate the same set of nodes. In other words, embodiments of the present disclosure provide increased efficiency the larger a network grows and/or the more diverse a set of problem inputs are queried simultaneously.

In various embodiments, once a synapse is computed, the sampling of the synapse determines whether the next node will be activated. However, inputs to the subsequent nodes can be the exact values of the incoming synapse as opposed to repetitive sampling. The computed value of a synapse may be used by a subsequent node and/or subsequent synapses even when the synapse is not activated. It will be appreciated that each of the synapses is operable to control activation of at least one of the nodes and each synapse has one or more associated activation weights.

In various alternative embodiments, modulation at the synapse level can be performed, where each node computes a single output as per a classical neural network model and the modulation is distinct in every synapse.

Figure 6:
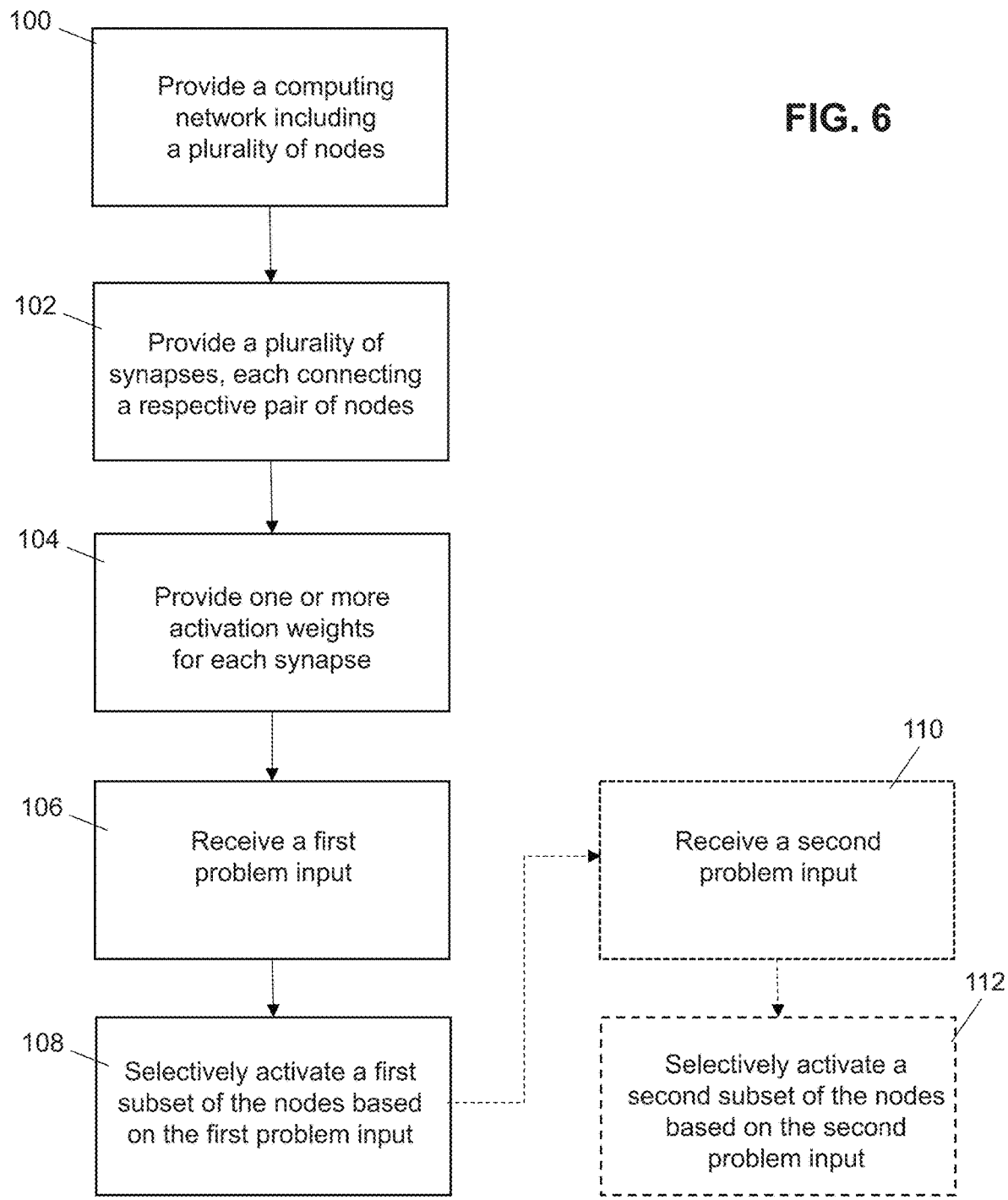
FIG. 6 is a flow diagram illustrating a method in accordance with embodiments of the present disclosure.

FIG. 6 illustrates a method for partially or selectively activating a computing network in accordance with embodiments of the present disclosure. As shown at 100, a computing network is provided, where the network includes multiple nodes. As at 102, multiple synapses are provided, wherein each of the synapses connects a respective pair of nodes. As at 104, one or more activation weights is provided and associated with a respective synapse. In various embodiments, a given synapse will have weights for each input synapse into the incoming node along with (generally) a constant. As disclosed herein, the activation weights and the constant, also known as an affine transform, are inside the synapse and not inside a node. Alternatively, the modulation of the synaptic probability of activation is inside the synapse—i.e., the synapses have one or more distinct value(s) that control how the information is passed to the respective destination node. Furthermore, each synapse can be provided with three components: signal, probability of activation, and output. The signal is computed by the activation weights, the input synapses (or nodes) and constant (i.e., the affine transform alongside any nonlinear further transform). The probability of activation is either at node level (such as the probability of any synapses activating the node) or at the synapse level. The output is a combination of the probability of activation and the signal, such that the network can be simultaneously trained on both the signal and the probability of activation.

FIG. 3 is a diagram 30 of a node with incoming and outgoing synapses in accordance with embodiments of the present disclosure, illustrating node activation, which may be AND node activation or OR node activation. For example, using OR node activation, a node is activated if any of the incoming synapses is activated, whereas using AND node activation, a node is activated only if all of the incoming synapses are activated. As an example, consider that incoming synapse $X_1$ has an output value of 0.9, incoming synapse $X_2$ has an output value of 0.1 and incoming synapse $X_3$ has an output value of 0.0 (which may indicate that the value of such incoming synapse has not been computed). Further, assume that synapse $Y_3$ has activation weights and a constant that are different from those associated with $Y_1$ and $Y_2$, where the activation weights and constant for synapse $Y_3$ are $w_0=1.2$, $w_1=0.6$, $w_2=-0.2$ and $w_3=0.7$. To calculate the output value of synapse $Y_3$, the synaptic activation probability, $g(\cdot)$, for node (using OR node activation) is determined as: $g\ n)=1-[(1-0.9)\ (1-0.1)\ (1-0.0)]=0.91$. The synaptic signal, $f(\cdot)$, can be determined, for example, using a sigmoidal activation function: $f(n, X)=\text{sig}\ (1.2+(0.6*0.9)-(0.2*0.1)+(0.7*0.0))=0.8481$. The synaptic output, $Y_3$, can then be determined using, for example, a multiplicative combination: $Y_3=g(\cdot)*f(\cdot)=0.7718$.

As a different example using AND node activation, consider that incoming synapse $X_1$ has an output value of 0.9, incoming synapse $X_2$ has an output value of 0.1 and incoming synapse $X_3$ has an output value of 0.3. Further, assume that synapse $Y_3$ has activation weights and a constant that are different from those associated with $Y_1$ and $Y_2$, where the activation weights and constant for synapse $Y_3$ are $w_0=1.2$, $w_1=0.6$, $w_2=-0.2$ and $w_3=0.7$. To calculate the output value of synapse $Y_3$, the synaptic activation probability, $g(\cdot)$, for node (using AND node activation) is determined as: $g(n) = (0.9*0.1*0.3) = 0.027$. The synaptic signal, $f(\cdot)$, can be determined, for example, using a sigmoidal activation function: $f(n, X) = \text{sig}(1.2+(0.6*0.9)-(0.2*0.1)+(0.7*0.3)) = 0.8732$. The synaptic output, $Y_3$, can then be determined using, for example, a multiplicative combination: $Y_3 = g(\cdot)*f(\cdot) = 0.0235$.

Figure 7:
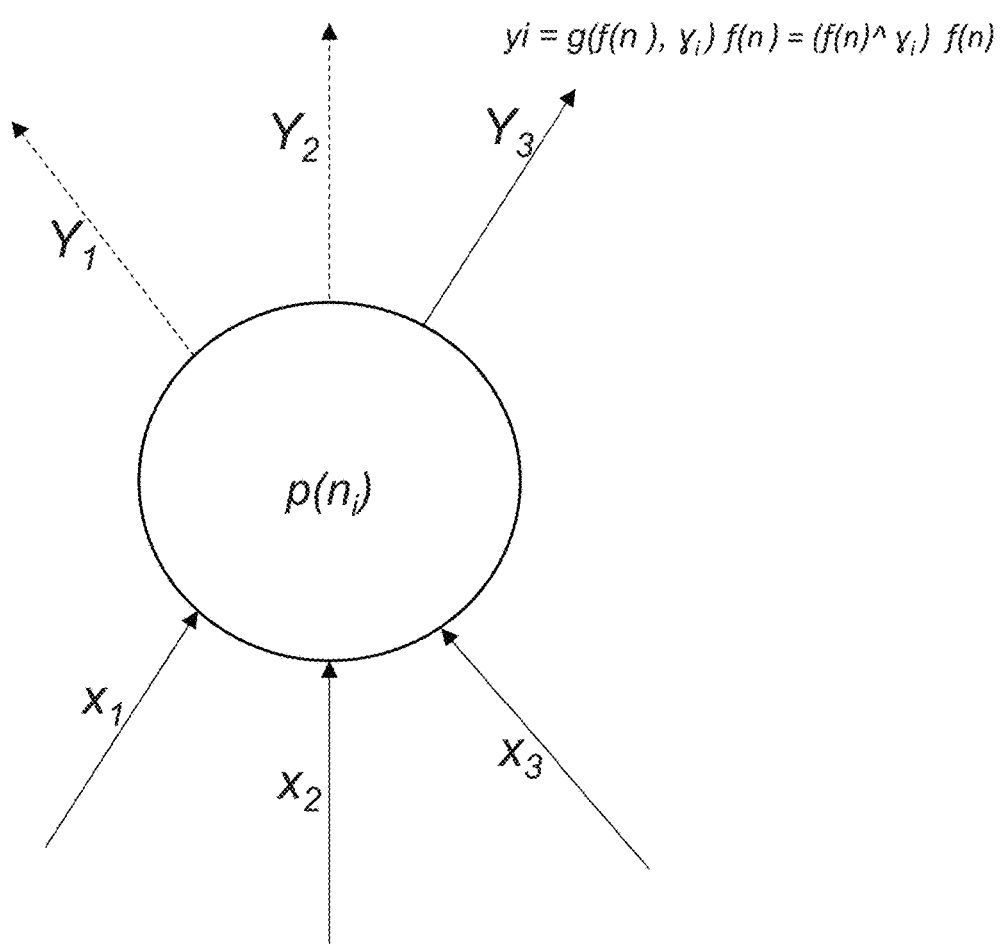
FIG. 7 is a diagram of a node with incoming and outgoing synapses in accordance with embodiments of the present disclosure, illustrating synaptic modulation where each outgoing synapse modulates the node output, which is common for all outgoing synapses.

FIG. 7 is a diagram 70 of a node with incoming and outgoing synapses in accordance with embodiments of the present disclosure, illustrating synaptic modulation where each outgoing synapse modulates the node output, which is common for all outgoing synapses. For this example, consider that incoming synapse $X_1$ has an output value of 0.9, incoming synapse $X_2$ has an output value of 0.1 and incoming synapse $X_3$ has an output value of 0.3. Further, assume that synapse $Y_3$ has activation weights and a constant that are different from those associated with $Y_1$ and $Y_2$, where the activation weights and constant for synapse $Y_3$ are $w_0 = 1.2$, $w_1 = 0.6$, $w_2 = -0.2$ and $w_3 = 0.7$. To calculate the output value of synapse $Y_3$, using a synaptic-specific modulation value of $\gamma_i = 0.25$, the synaptic signal, $f(\cdot)$, can be determined, for example, using a sigmoidal activation function: $f(X) = \text{sig}(1.2+(0.6*0.9)-(0.2*0.1)+(0.7*0.3)) = 0.8732$. The synaptic activation probability, $g(\cdot)$, for node (using exponential activation) can be determined as: $g(n) = (0.8743^{\wedge}0.25) = 0.9667$. The synaptic output, $Y_3$, can be determined, for example, using a multiplicative combination: $Y_3 = g(\cdot)*f(\cdot) = 0.8441$.

As described herein, it will be appreciated that the activation probability of the previous node (or synapse) is combined with the subsequent synapses' signal to form the output of each outgoing synapse. This creates a chain of dependence for the activated output nodes with all of the preceding activations, thus allowing the network to be trained both on the signal and on the activation probability. Since a computed synapse/node may be used regardless of activation, inasmuch as a node/synapse receiving that information has been activated via a different pathway, the network can be configured, manually or in training, to have fully activated pathways that run alongside signal pathways, the former propagating the signal and the latter computing the signal.

Returning to FIG. 6, as at 106, a first problem input is received. As at 108, a first subset of the nodes is selectively activated based on the first problem input. It will be appreciated that each of the synapses controls the activation of zero or more of the nodes. In this way, each node is not necessarily activated for each problem input.

As indicated in dashed lines in FIG. 6, the method according to embodiments of the present disclosure may optionally receive a second problem input as at 110 and may optionally, as at 112, selectively activate a second subset of the nodes based on the second problem input. As described elsewhere herein, the second subset of nodes is different from the first subset of nodes and can be selectively activated in parallel with the activation of the first subset of nodes.

Figure 8A:
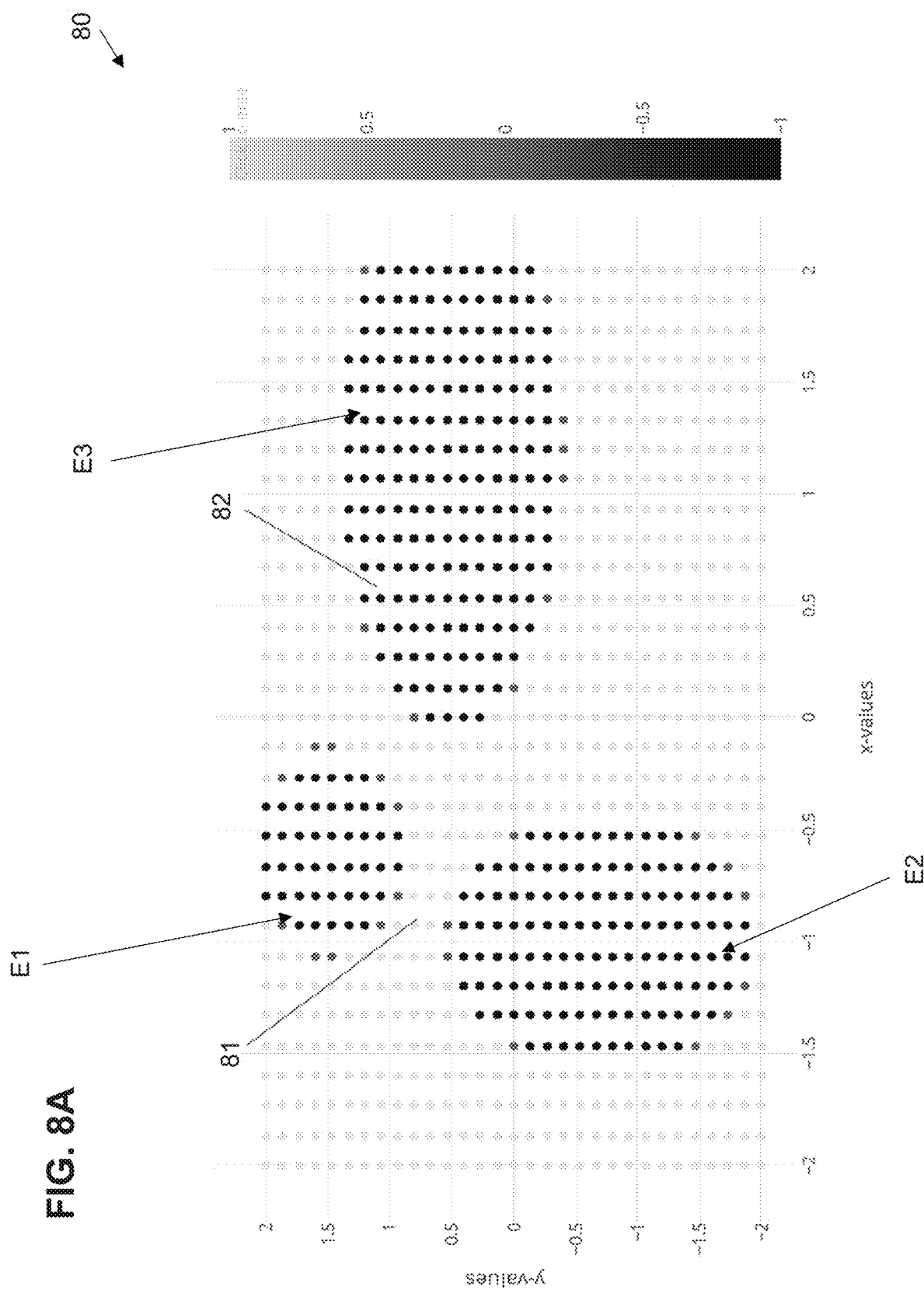
FIGS. 8A-8D are graphical representations illustrating a synthetic data test pertaining to embodiments of the present disclosure.
Figure 8B:
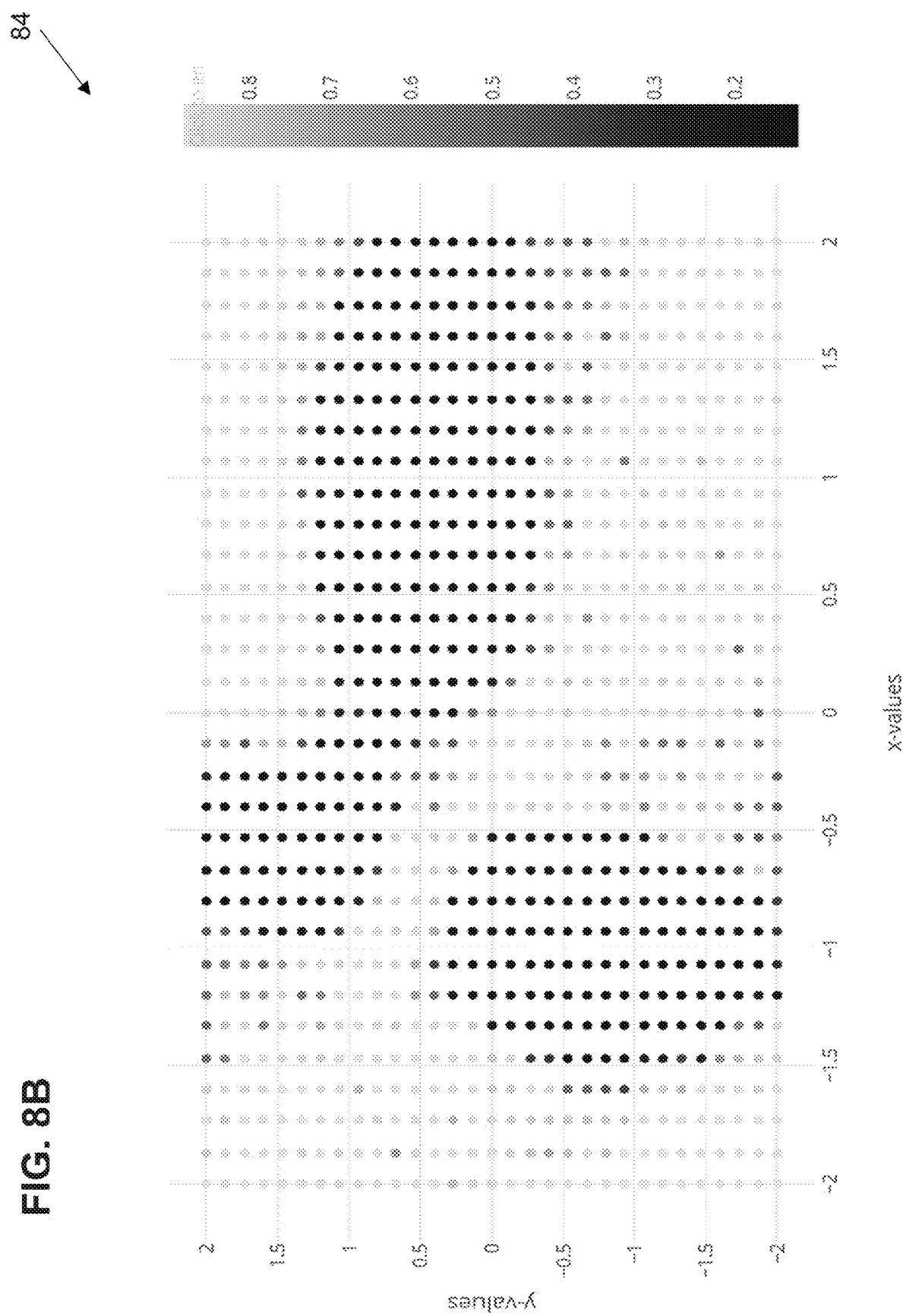
Figure 8C:
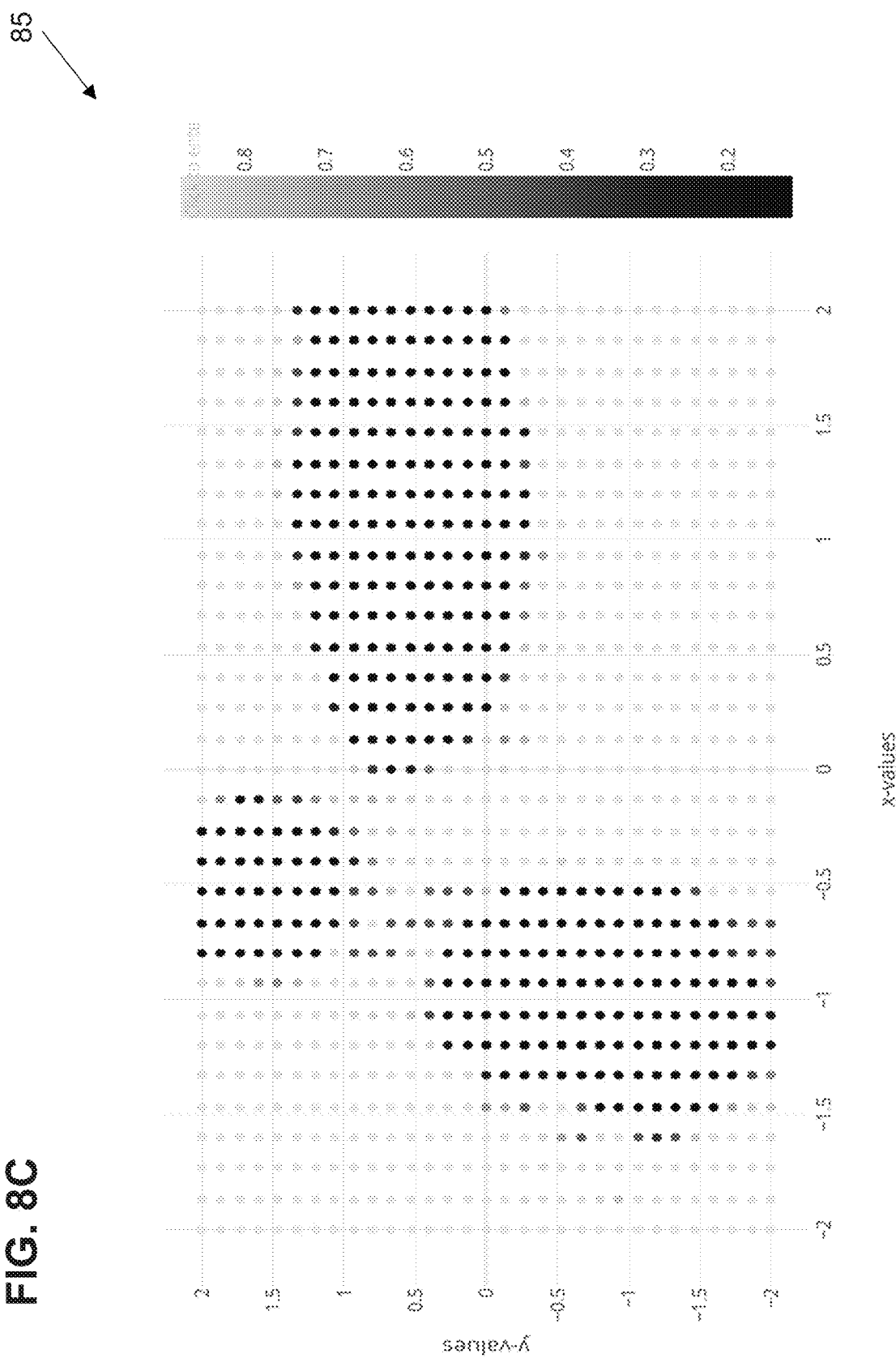
Figure 8D:
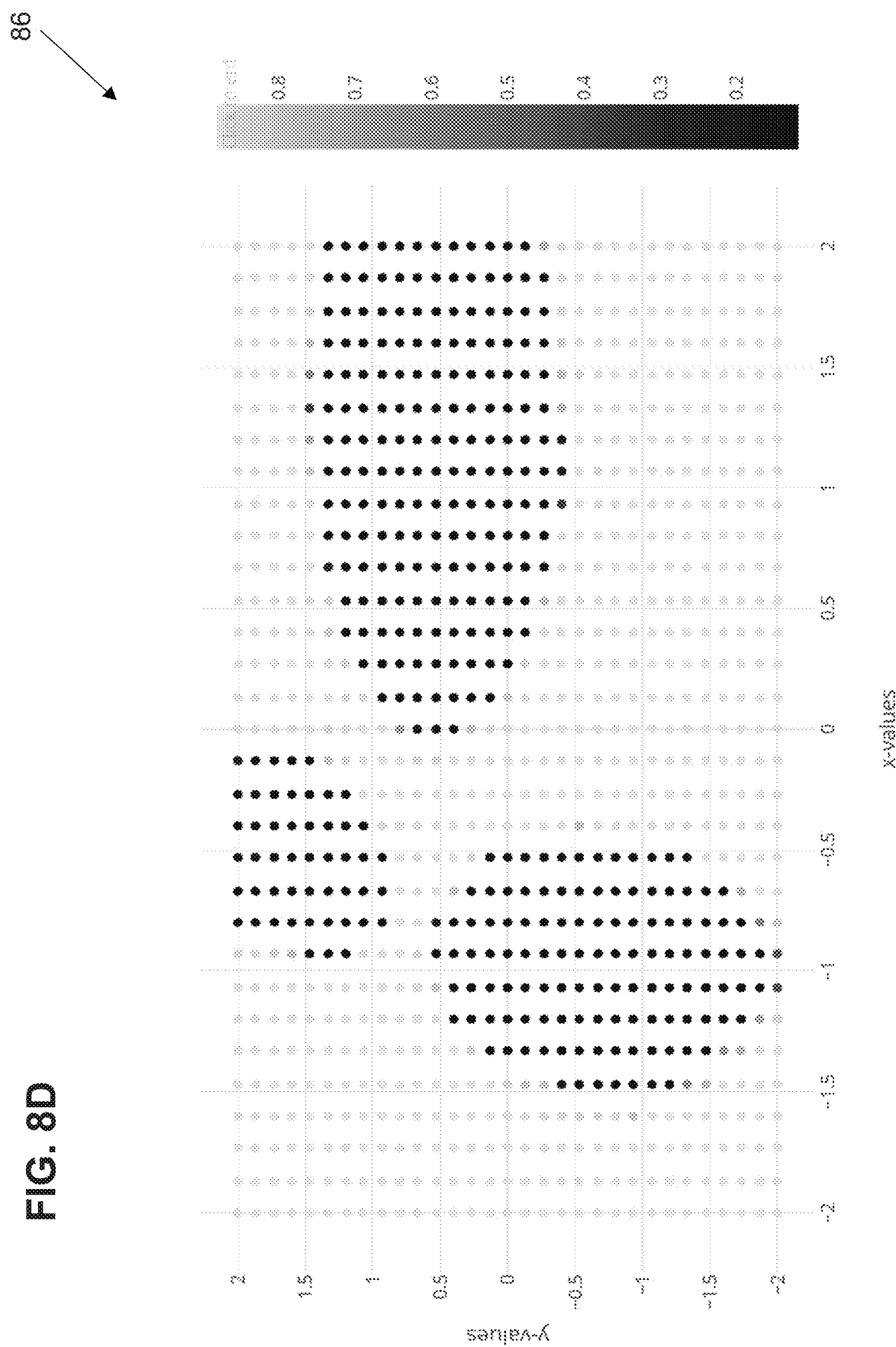

FIGS. 8A-8D are graphical representations illustrating a synthetic data test pertaining to embodiments of the present disclosure. As shown in graph 80 of FIG. 8A, a data-generating process is depicted representing ground truth, where elliptical regions E1, E2 and E3 of different sizes belong to one class, whilst data in the remaining space is of the opposite class. Element 81 represents a false value and element 82 represents a true value. Graph 84 of FIG. 8B shows the fitted values after 250,000 stochastic training cycles in accordance with the present disclosure. Graph 85 of FIG. 8C shows the fitted values after 500,000 stochastic training cycles in accordance with the present disclosure. Graph 86 of FIG. 8D shows the fitted values after 1,000,000 stochastic training cycles in accordance with the present disclosure. As can be seen by graph 86 in FIG. 8D, the fitting improves predictably as the training progresses.

Figure 9A:
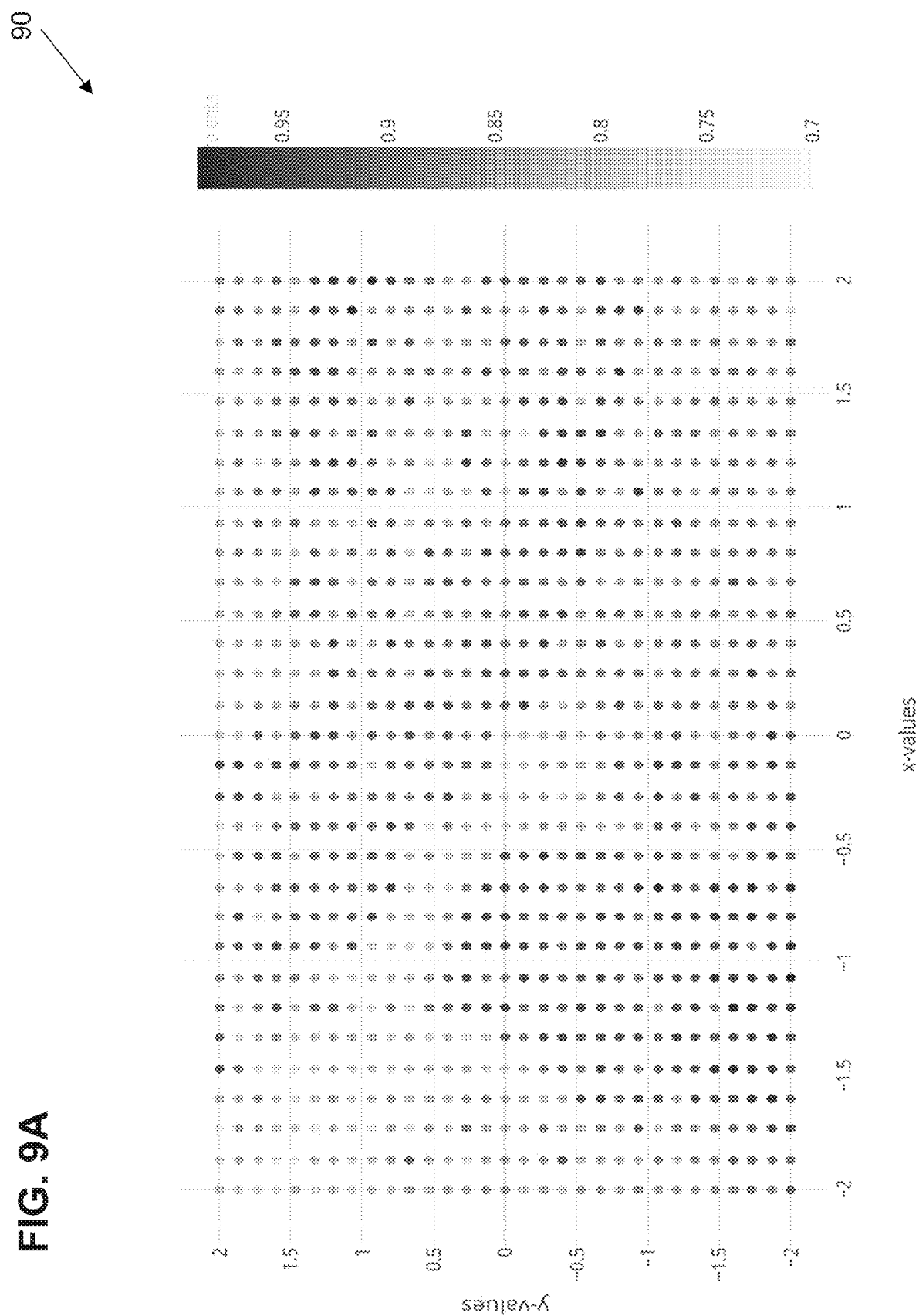
FIGS. 9A-9C are graphical representations illustrating percentage of computed synapses pursuant to a synthetic data test pertaining to embodiments of the present disclosure.
Figure 9B:
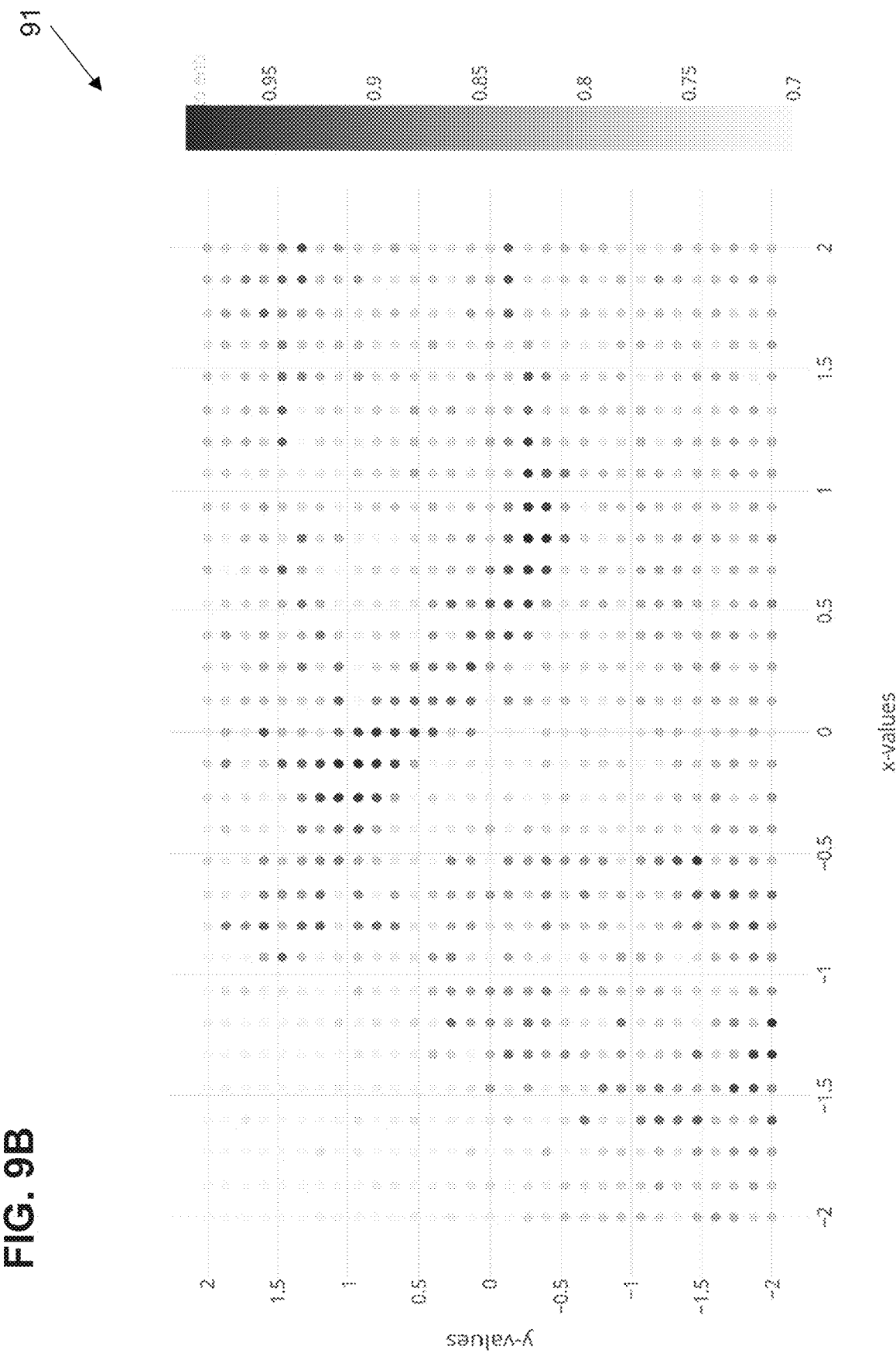
Figure 9C:
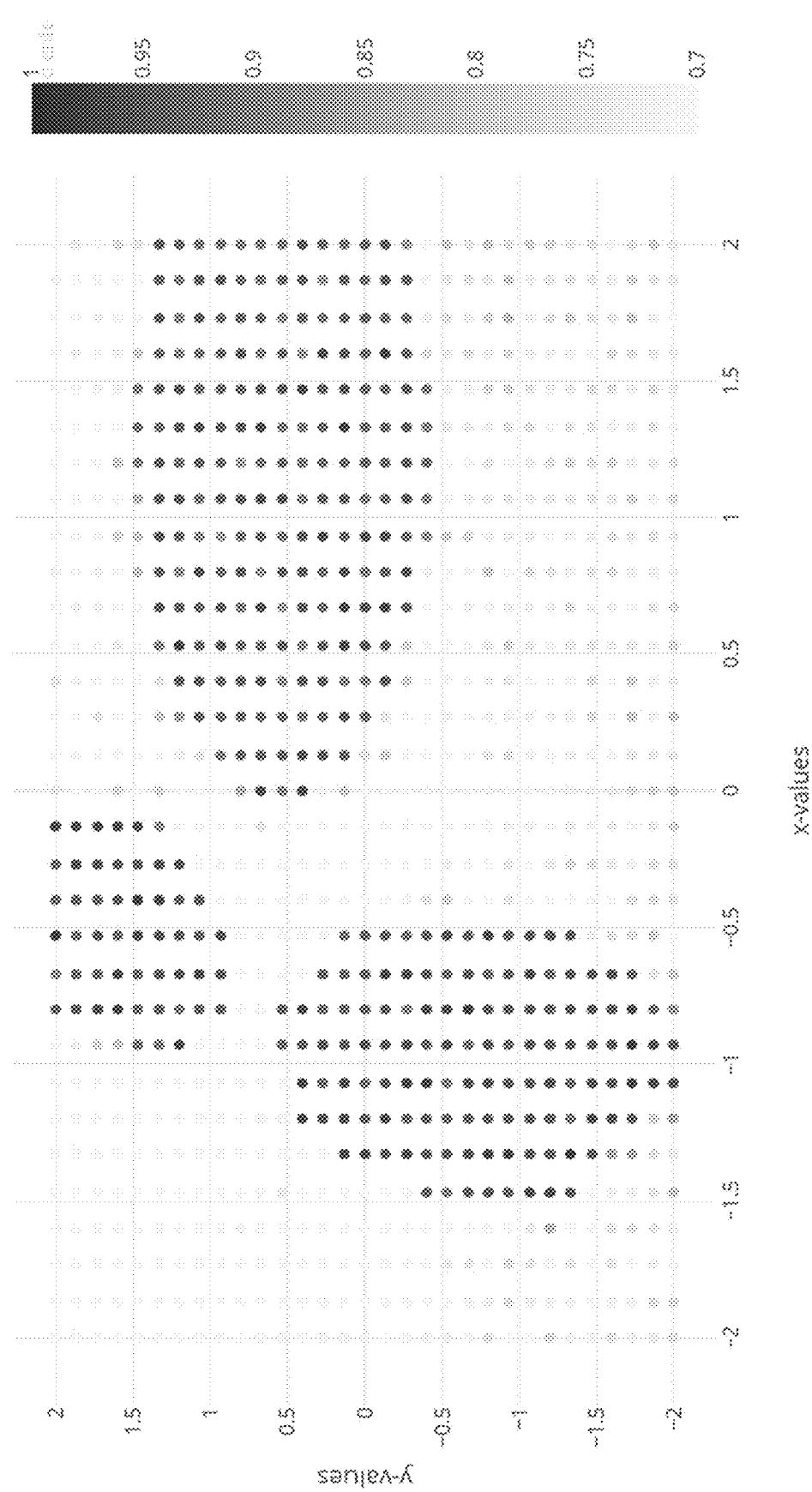

FIGS. 9A-9C are graphical representations illustrating percentage of computed synapses pursuant to the synthetic data test shown in FIGS. 8A-8D. Graph 90 in FIG. 9A corresponds to the 250,000 stochastic training cycles shown in graph 84 of FIG. 8B, Graph 91 in FIG. 9B corresponds to the 500,000 stochastic training cycles shown in graph 85 of FIG. 8C and Graph 92 in FIG. 9C corresponds to the 1,000,000 stochastic training cycles shown in graph 86 of FIG. 8D. As can be seen, as the fitting improves with more training, the network activation varies, clearly homing in the data-generating process, with a greater resource utilization for data inside the elliptical regions which is harder to classify.

Figure 10A:
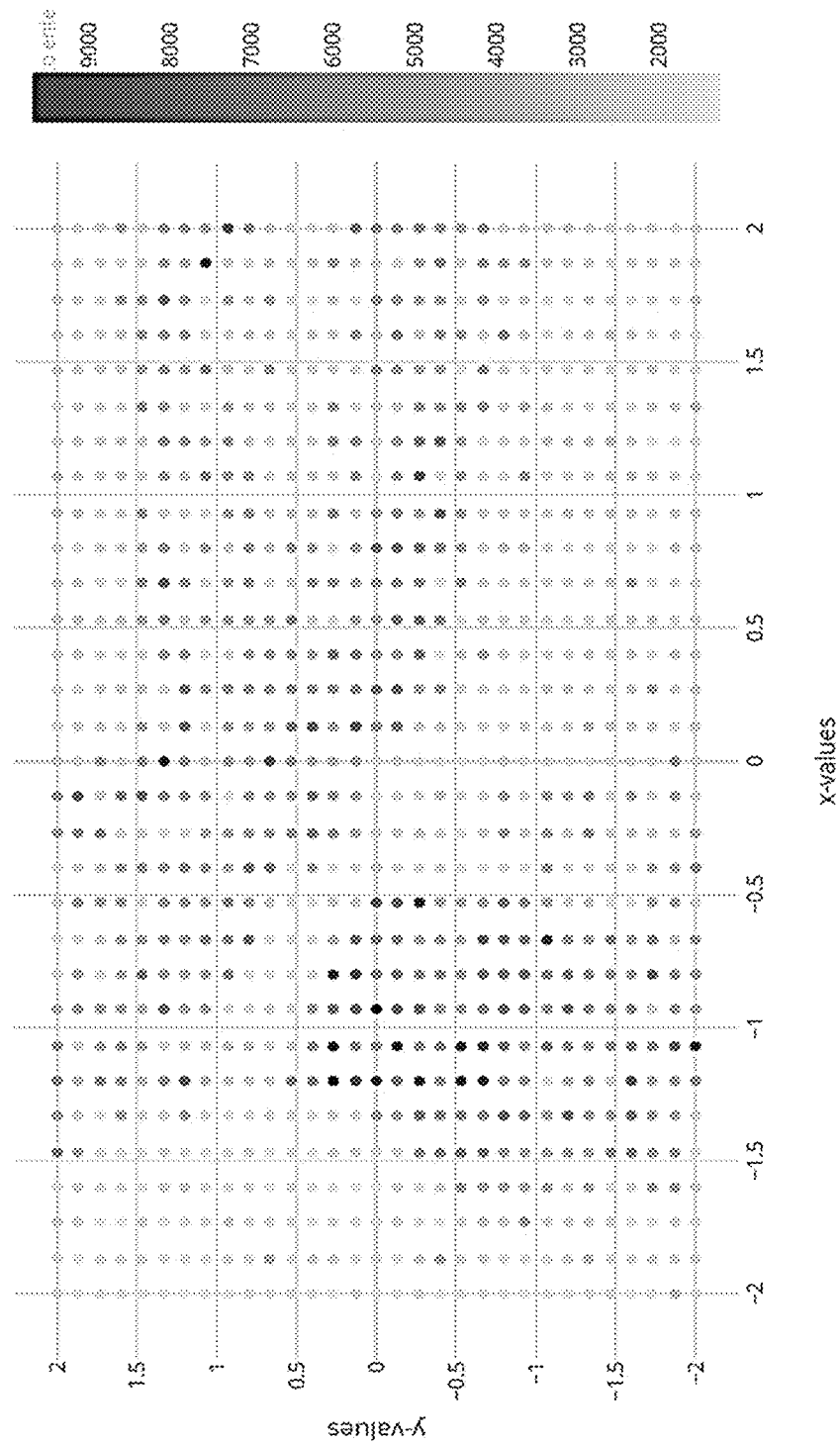
FIGS. 10A-10C are graphical representations illustrating computation time per stochastic query point for a synthetic data test pertaining to embodiments of the present disclosure.
Figure 10B:
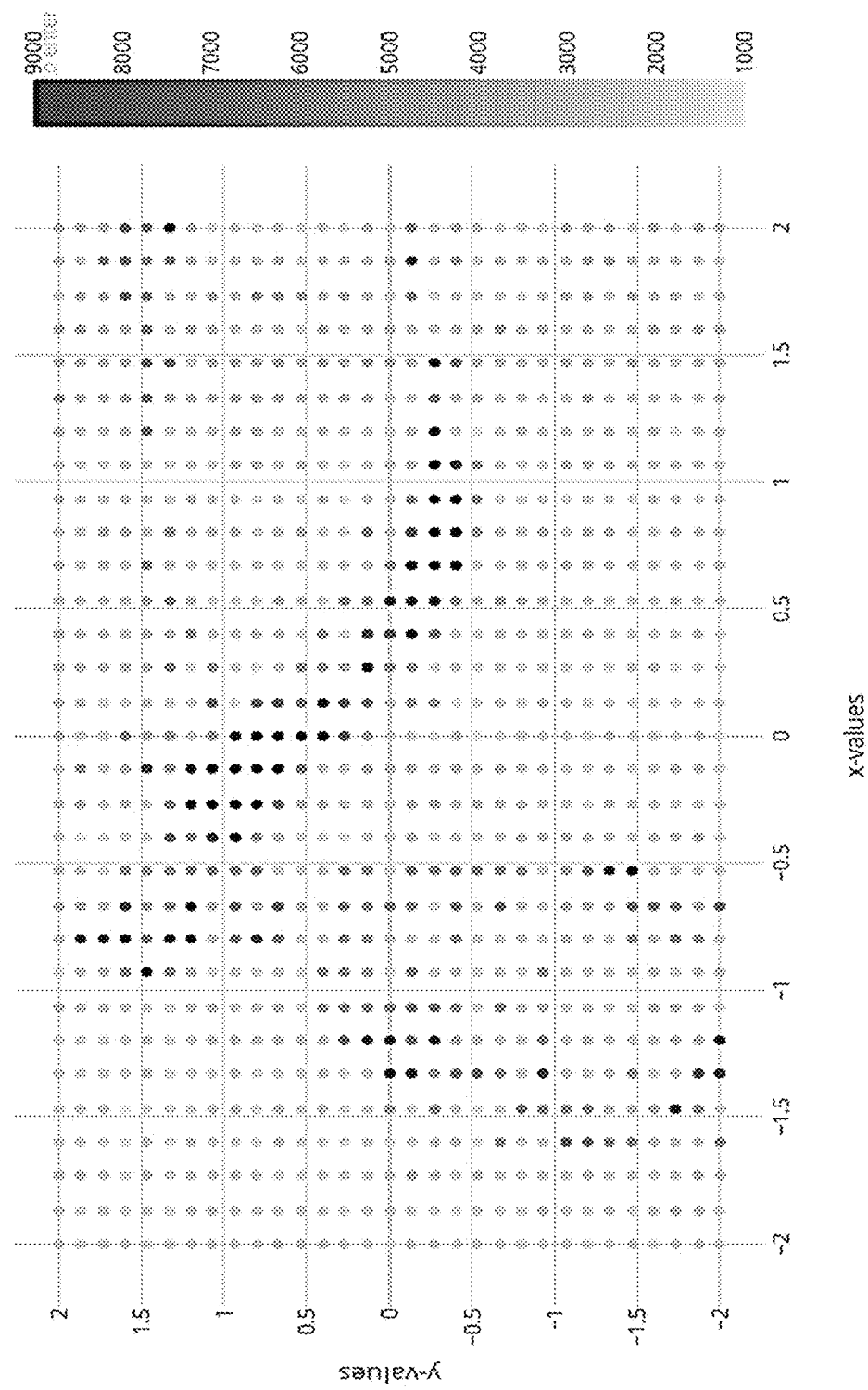
Figure 10C:
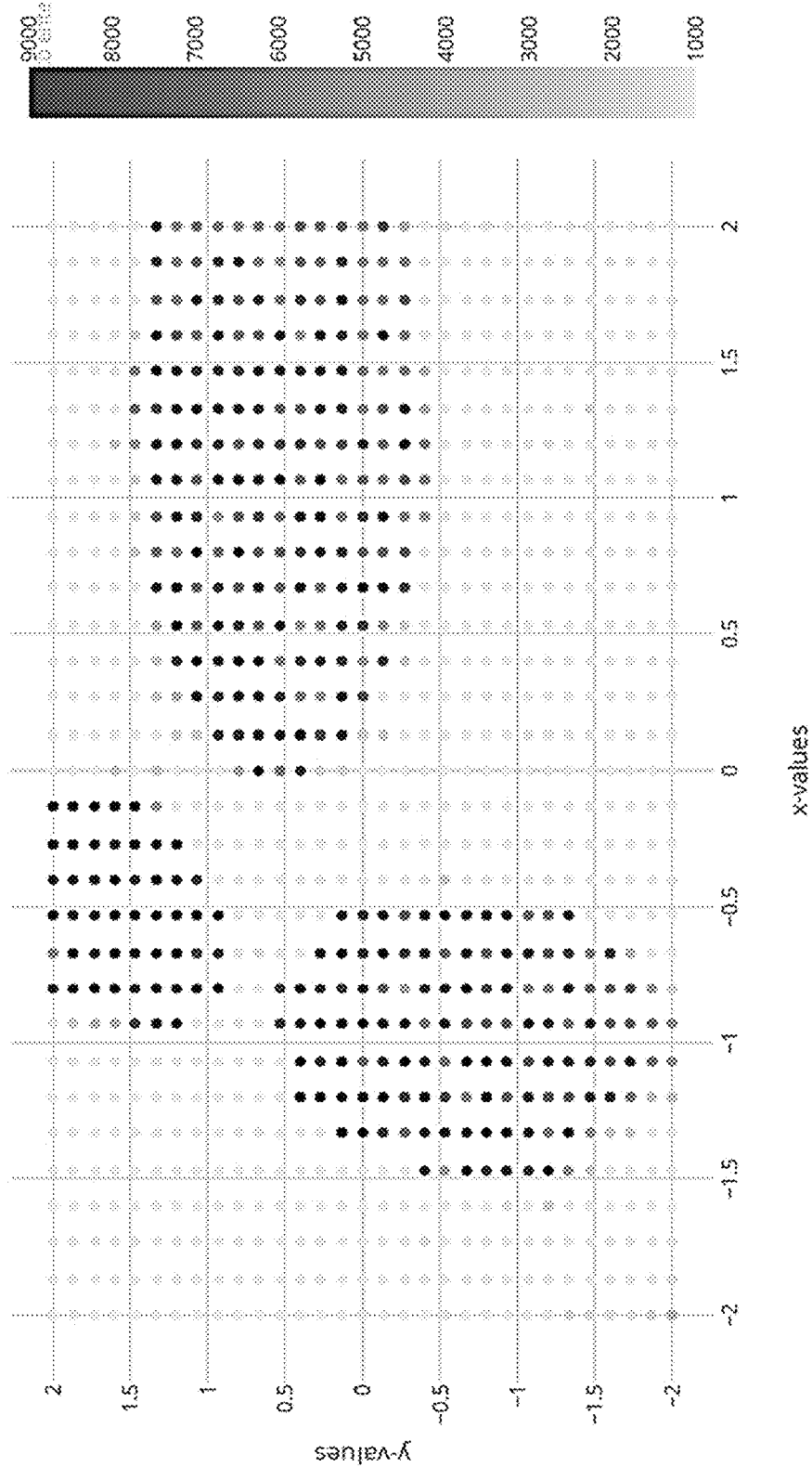

FIGS. 10A-10C are graphical representations illustrating computation time per stochastic query point corresponding to the synthetic data test described above. In other words, the same stages of training are shown for the actual computation time (in microseconds) per stochastic query point. Graph 120 in FIG. 10A corresponds to the 250,000 stochastic training cycles shown in graph 84 of FIG. 8B, Graph 122 in FIG. 10B corresponds to the 500,000 stochastic training cycles shown in graph 85 of FIG. 8C and Graph 124 in FIG. 10C corresponds to the 1,000,000 stochastic training cycles shown in graph 86 of FIG. 8D. As can be seen, the compute time varies clearly with the pattern to be fitted, indicating a greater use of computational resources for harder input points.

As described, the present disclosure contemplates a variety of different systems each having one or more of a plurality of different features, attributes, or characteristics. A "system" as used herein can refer, for example, to various configurations of one or more computing networks, processing elements or computing devices, such as desktop computers, laptop computers, tablet computers, personal digital assistants, mobile phones, and other mobile computing devices. In certain embodiments in which the system includes a computing device, the computing device is any suitable computing device (such as a server) that includes at least one processor and at least one memory device or data storage device. As further described herein, the computing device includes at least one processor configured to transmit and receive data or signals representing events, messages, commands, or any other suitable information. The processor of the computing device is configured to execute the events, messages, or commands represented by such data or signals in conjunction with the operation of the computing device. As described elsewhere herein, embodiments of the disclosure can be developed on specialized hardware where nodes and synapses contain the calculation (and stochastic sampling) capabilities.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component." or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs, processing elements or components. These programs, processing elements and/or components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices, elements or components of the present disclosure that are in communication with each other do not need to be in continuous communication with each other. Further, devices, elements or components in communication with other devices or components can communicate directly or indirectly through one or more intermediate devices, elements or components or other intermediaries. Further, descriptions of embodiments of the present disclosure herein wherein several devices, elements and/or components are described as being in communication with one another does not imply that all such devices, elements or components are required, or that each of the disclosed devices, elements or components must communicate with every other device, element or component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers, processing elements and/or computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:
1. A method for activating a stochastic neural network, comprising:
   providing a stochastic neural network comprising a plurality of nodes;
   providing a plurality of synapses, wherein each of the plurality of synapses comprises a connection between a respective pair of the plurality of nodes;

providing a plurality of activation weights, wherein each of the plurality of activation weights is associated with a respective synapse of the plurality of synapses; and upon receiving a first problem input and a second problem input, concurrently:

activating a first subset of the plurality of nodes based upon the first problem input and the activation weight of one or more of the plurality of synapses that feed into the first subset of the plurality of nodes, and activating a second subset of the plurality of nodes based upon the second problem input and the activation weight of one or more of the plurality of synapses that feed into the second subset of the plurality of nodes.

2. The method of claim 1, wherein the first problem input is different from the second problem input and wherein the first subset of the plurality of nodes is the same as the second subset of the plurality of nodes.

3. The method of claim 1, wherein the first problem input is the same as the second problem input and wherein the first subset of the plurality of nodes is different from the second subset of the plurality of nodes.

4. The method of claim 1, wherein the first problem input is different from the second problem input and wherein the first subset of the plurality of nodes is different from the second subset of the plurality of nodes.

5. The method of claim 1, wherein the first subset of the plurality of nodes comprises a first node, and wherein a computational lock over the first node is selectively applied when activating the first subset of the plurality of nodes.

6. The method of claim 1, wherein a computational lock over one or more of the plurality of synapses is selectively applied.

7. The method of claim 1, wherein at least one of the one or more of the plurality of synapses that feed into the first subset of the plurality of nodes has an output value that has not been computed.

8. The method of claim 1, further comprising:

providing a plurality of processing elements, wherein each of the plurality of processing elements is embedded in a respective synapse of the plurality of synapses, wherein each of the plurality of processing elements is adapted to receive an input and generate an output based on the input, wherein the output of a first synapse of the one or more of the plurality of synapses that feed into the first subset of the plurality of nodes comprises a synaptic value computed according to a path preceding the first synapse, and activating a third subset of the plurality of nodes using the synaptic value of the first synapse.

9. The method of claim 8, wherein the path comprises the output of one or more of the plurality of synapses that feed into the first synapse and that are activated.

10. The method of claim 1, further comprising upon determining that first and second synapses of the one or more of the plurality of synapses have correlated inputs into the first node, recycling the first synapse and changing the activation weight for the first synapse.

11. The method of claim 1, wherein the first node of the plurality of nodes feeds into two or more of the plurality of synapses, and wherein the activation weight associated with a first synapse of the two or more of the plurality of synapses is different from the activation weight associated with a second synapse of the two or more of the plurality of synapses.

12. The method of claim 1, wherein the first node of the subset of nodes feeds into a first subset of the plurality of synapses.

13. The method of claim 1, further comprising generating an output based on the first problem input.

14. The method of claim 13, wherein the output comprises a computed value, wherein the method further comprises determining whether the first node of the plurality of nodes will be activated based on the computed value and wherein the computed value comprises an input to a subsequent node of the plurality of nodes after the first node.

15. The method of claim 1, wherein the plurality of nodes comprises a stochastic output node which may or may not be activated.

16. A computing system, comprising:

a stochastic neural network comprising a plurality of nodes, wherein the plurality of nodes comprises a first subset of nodes and a second subset of nodes, wherein the first subset of nodes comprises a first node;

a plurality of synapses, wherein each synapse of the plurality of synapses connects a respective pair of the plurality of nodes; and a plurality of processing elements, wherein each of the plurality of processing elements is embedded in a respective synapse of the plurality of synapses;

wherein, upon receipt of a first problem input and a second problem input, the first subset of nodes of the stochastic neural network is activated by at least one of the plurality of synapses and the second subset of nodes of the stochastic neural network is activated by at least one of the plurality of synapses concurrently with the activation of the first subset of nodes.

17. The computing system of claim 16, wherein the first problem input is different from the second problem input and wherein the first subset of the plurality of nodes is the same as the second subset of the plurality of nodes.

18. The computing system of claim 16, wherein the first problem input is the same as the second problem input and wherein the first subset of the plurality of nodes is different from the second subset of the plurality of nodes.

19. The computing system of claim 16, wherein the first problem input is different from the second problem input and wherein the first subset of the plurality of nodes is different from the second subset of the plurality of nodes.

20. The computing system of claim 16, wherein each synapse of the plurality of synapses comprises a signal, a probability of activation and an output, wherein a first synapse of the plurality of synapses feeds into the first node, wherein the first node feeds into a second synapse of the plurality of synapses and wherein the probability of activation of the first synapse is combined with the signal from the second synapse to form a second synapse output.

21. The computing system of claim 20, wherein the output of the first synapse comprises a computed value computed according to a path preceding the first synapse, wherein the computing system determines whether the first node will be activated based on the computed value.

22. The computing system of claim 21, wherein the path comprises the output of one or more of the plurality of synapses that feed into the first synapse and that are activated.

23. The computing system of claim 20, wherein the second synapse output comprises a computed value that comprises an input to a subsequent node of the plurality of nodes after the first node.

24. The computing system of claim 16, wherein each of the plurality of synapses is operable to control activation of at least one of the plurality of nodes.

25. The computing system of claim 16, further comprising a plurality of activation weights, wherein each of the plurality of activation weights is associated with a respective synapse of the plurality of synapses.

26. The computing system of claim 25, wherein activation of the first node of the plurality of nodes is dependent upon the activation weight of the first synapse.

27. The computing system of claim 25, wherein the activation weight associated with the first synapse is different from the activation weight associated with the second synapse.

28. The computing system of claim 16, wherein the plurality of nodes comprises a stochastic output node which may or may not be activated.

\* \* \* \* \*